US012665119B2

(12) United States Patent
Yamashita et al.

(10) Patent No.: US 12,665,119 B2
(45) Date of Patent: Jun. 23, 2026

(54) MAGNETIC CORE AND MAGNETIC COMPONENT

(71) Applicant: DELTA ELECTRONICS (JAPAN), INC., Tokyo (JP)

(72) Inventors: Shokan Yamashita, Niigata-ken (JP); Akio Hanada, Niigata-ken (JP); Munemitsu Abe, Miyagi-ken (JP)

(73) Assignee: DELTA ELECTRONICS (JAPAN), INC., Tokyo (JP)

( * ) Notice: Subject to any disclaimer, the term of this patent is extended or adjusted under 35 U.S.C. 154(b) by 248 days.

(21) Appl. No.: 18/172,542

(22) Filed: Feb. 22, 2023

(65) Prior Publication Data

US 2023/0207179 A1     Jun. 29, 2023

Related U.S. Application Data

(63) Continuation of application No. PCT/JP2021/032510, filed on Sep. 3, 2021.

(30) Foreign Application Priority Data

Sep. 9, 2020     (JP) ................................. 2020-151207

(51) Int. Cl.
*H02K 1/02* (2006.01)
*H01F 1/153* (2006.01)
*H01F 27/25* (2006.01)

(52) U.S. Cl.
CPC ......... *H01F 27/25* (2013.01); *H01F 1/15333* (2013.01); *H02K 1/02* (2013.01)

(58) Field of Classification Search
CPC .. H01F 27/25; H01F 1/15333; H01F 41/0226; H01F 3/02; H02K 1/02; H02K 1/14; H02K 15/02
See application file for complete search history.

(56) References Cited

U.S. PATENT DOCUMENTS

| | | | |
|---|---|---|---|
| 6,448,682 B2 | 9/2002 | Sakagami et al. | |
| 2014/0152416 A1* | 6/2014 | Herzer ................... | C22C 45/02 |
| | | | 335/297 |
| 2017/0229237 A1 | 8/2017 | Makino et al. | |
| 2017/0229929 A1* | 8/2017 | Fahrenbach ............. | H02K 1/14 |

(Continued)

FOREIGN PATENT DOCUMENTS

| | | |
|---|---|---|
| JP | 2007-159300 | 6/2007 |
| JP | 2017-108578 | 6/2017 |

(Continued)

OTHER PUBLICATIONS

International Search Report from International Application No. PCT/JP2021/032510 dated Nov. 22, 2021.

*Primary Examiner* — Thomas Truong
(74) *Attorney, Agent, or Firm* — Winston Hsu

(57) ABSTRACT

In a magnetic core including a core assembly having a structure that multiple thin strip blocks are arranged, the thin strip blocks being formed of multiple laminates of nanocrystalline thin strips made of a nanocrystal-containing alloy material, the thin strip block includes a fixedly joined portion in which the nanocrystalline thin strips adjacent to each other in a lamination direction are fixedly joined together. The fixedly joined portion may include side surfaces of the nanocrystalline thin strips and may be a laser welded portion.

11 Claims, 14 Drawing Sheets

(56)     References Cited

U.S. PATENT DOCUMENTS

2019/0074115 A1*   3/2019  Ohta ................... H01F 41/0226
2019/0173328 A1*   6/2019  Nishikawa .......... H01F 1/15333
2020/0177040 A1*   6/2020  Iwasaki ................... H02K 5/24

FOREIGN PATENT DOCUMENTS

JP        2017-141508      8/2017
WO          1999/21264     4/1999
WO          1999/21268     4/1999
WO        2018/105473      6/2018

* cited by examiner

FIG. 5

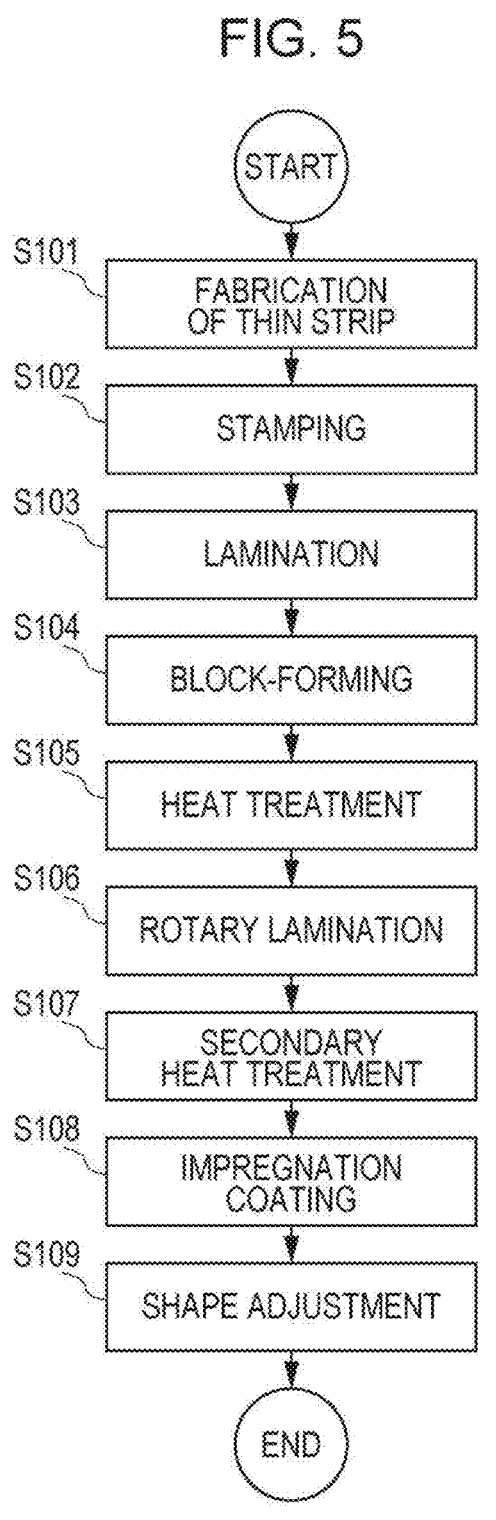

START

S101 — FABRICATION OF THIN STRIP

S102 — STAMPING

S103 — LAMINATION

S104 — BLOCK-FORMING

S105 — HEAT TREATMENT

S106 — ROTARY LAMINATION

S107 — SECONDARY HEAT TREATMENT

S108 — IMPREGNATION COATING

S109 — SHAPE ADJUSTMENT

END

FIG. 6

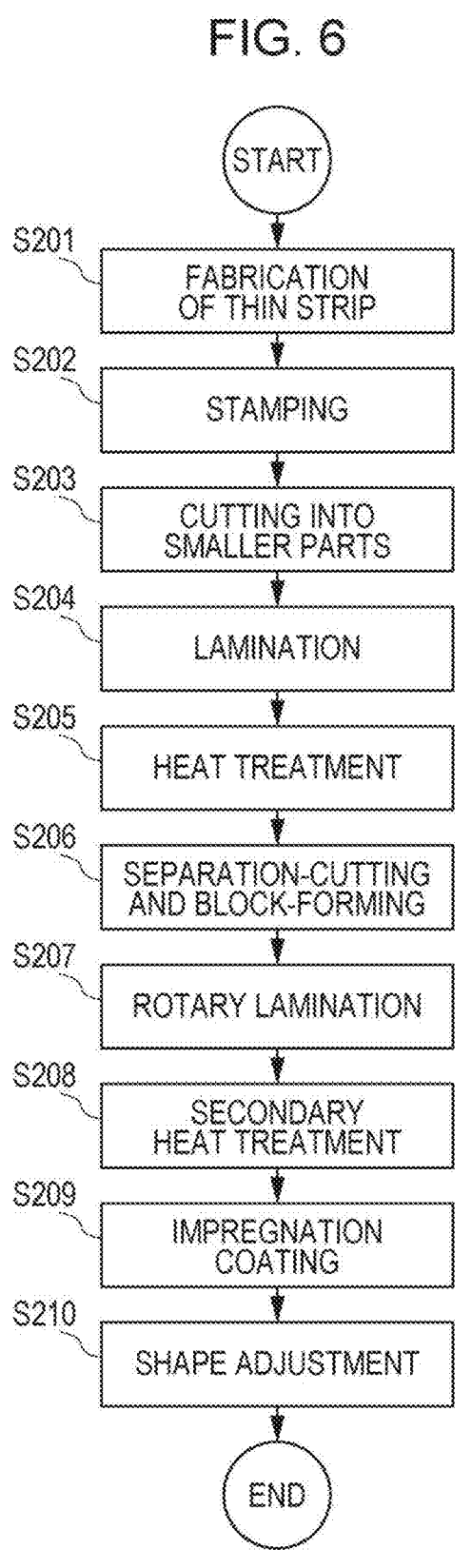

START

S201 — FABRICATION OF THIN STRIP

S202 — STAMPING

S203 — CUTTING INTO SMALLER PARTS

S204 — LAMINATION

S205 — HEAT TREATMENT

S206 — SEPARATION-CUTTING AND BLOCK-FORMING

S207 — ROTARY LAMINATION

S208 — SECONDARY HEAT TREATMENT

S209 — IMPREGNATION COATING

S210 — SHAPE ADJUSTMENT

END

FIG. 8A
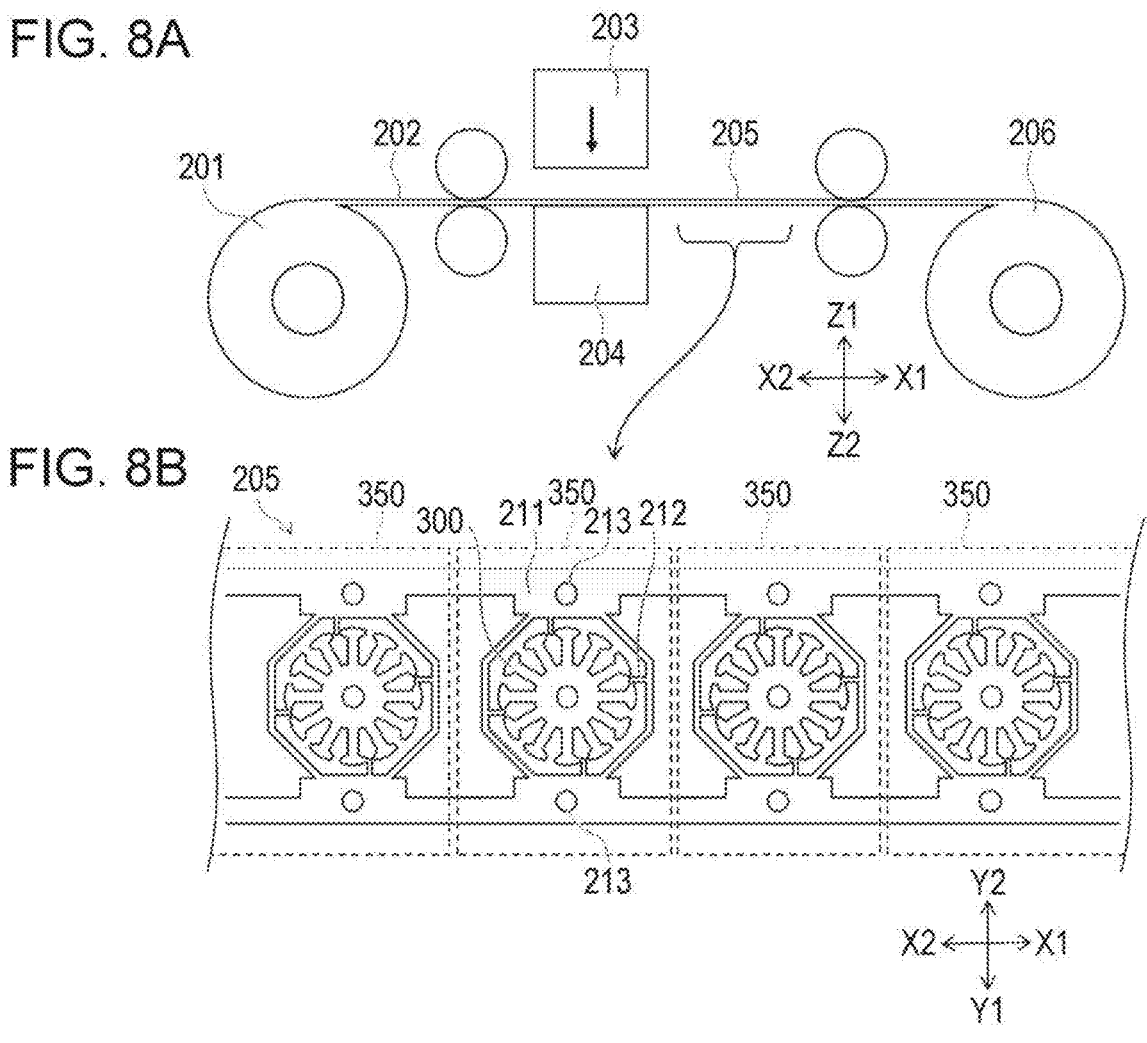
FIG. 8B
FIG. 8C
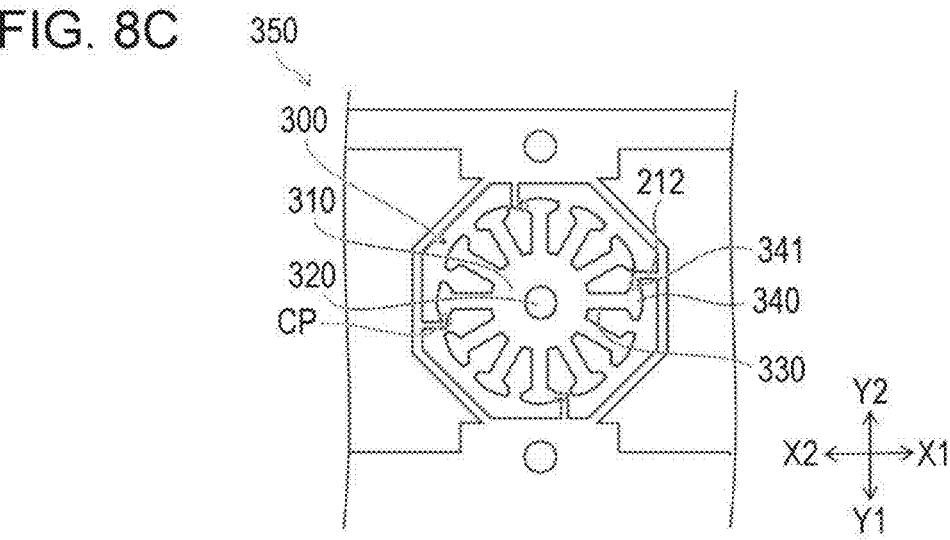

MAGNETIC CORE AND MAGNETIC COMPONENT

CLAIM OF PRIORITY

This application is a Continuation of International Application No. PCT/JP2021/032510 filed on Sep. 3, 2021, which claims benefit of Japanese Patent Application No. 2020-151207 filed on Sep. 9, 2020. The entire contents of each application noted above are hereby incorporated by reference.

BACKGROUND OF THE INVENTION

1. Field of the Invention

The present invention relates to a magnetic core and a magnetic component including the magnetic core.

2. Description of the Related Art

Japanese Unexamined Patent Application Publication No. 2017-141508 discloses a heat treatment apparatus for a laminate of amorphous alloy thin strips, the heat treatment apparatus including a lamination jig that holds the laminate of the amorphous alloy thin strips, two heating plates that sandwich the laminate from upper and lower surface sides in a lamination direction without contacting the lamination jig, and a heating control device that controls heating and temperature of the two heating plates. By heat-treating the laminate of the amorphous alloy thin strips with the disclosed heat treatment apparatus, a magnetic core including a laminate of thin strips made of a Fe-based nanocrystalline alloy can be obtained.

International Publication No. 1999/21264 discloses a laminated core for a motor, the core including multiple magnetic plates laminated one above another and being provided with magnetic poles each having an uneven surface that includes ridges and grooves alternately formed along a direction of rotation of the motor, wherein fixedly joined portions in each of which the magnetic plates are fixedly joined together are formed in surfaces of the grooves formed in the magnetic poles.

SUMMARY OF THE INVENTION

When the laminate of the amorphous alloy thin strips, disclosed in Japanese Unexamined Patent Application Publication No. 2017-141508, are heat-treated, heat generates due to crystallization of the amorphous alloy thin strips. Unless the generated heat is properly controlled, magnetic characteristics of the obtained laminate of the thin strips made of the nanocrystalline alloy (called a laminate of nanocrystalline thin strips) may not be properly improved, or thermal runaway may occur, thus causing burning of the thin strips in some cases. The number of the laminated thin strips in the laminate of the amorphous alloy thin strips is related to the heat generated in the laminate during the heat treatment and is also deeply related to magnetic characteristics of the magnetic core including the laminate. Accordingly, when laminates different in the number of the laminated thin strips are prepared to obtain multiple types of magnetic cores with different magnetic characteristics, heat treatment conditions need to be set individually for each of the laminates. If the amorphous alloy thin strips are heat-treated in a state separated one by one instead of heat-treating the laminate in bulk, the nanocrystalline thin strips obtained with the heat treatment are difficult to handle because of being brittle, and damages, such as cracking and chipping, are likely to occur in a step of laminating the nanocrystalline thin strips one above another. This gives rise to a problem in the viewpoint of ensuring the quality of the magnetic core.

The present invention provides a magnetic core having a structure that nanocrystalline thin strips are laminated one above another and having easily stabilized magnetic characteristics. The present invention further provides a magnetic component including the magnetic core.

According to one aspect, the present invention provides a magnetic core including a core assembly having a structure that multiple thin strip blocks are arranged, the thin strip blocks being formed of multiple laminates of nanocrystalline thin strips made of a nanocrystal-containing alloy material, wherein the thin strip blocks include fixedly joined portions in each of which the nanocrystalline thin strips adjacent to each other in a lamination direction are fixedly joined together.

Since the core assembly (core stack) can be fabricated by preparing the thin strip block made up of the nanocrystalline thin strips laminated one above another, and by arranging a multiple number of the thin strip blocks. Therefore, failures, such as damages, are less likely to occur in the nanocrystalline thin strips than in the case of forming a laminated core by laminating the nanocrystalline thin strips one by one. As a result, the quality of the magnetic core obtained by covering the core assembly with an impregnated coating can be increased.

When the core assembly is constituted along the lamination direction of the nanocrystalline thin strips in the thin strip block, a direction (array direction) in which the multiple thin strip blocks are arrayed is along a direction (lamination direction) in which the multiple nanocrystalline thin strips forming the thin strip block are laminated, and the core assembly has a structure that many nanocrystalline thin strips are laminated one above another as in the related-art laminated core. However, the core assembly is different from the related-art core in including multiple portions (thin strip blocks) in each of which a predetermined number of the nanocrystalline thin strips are integrated by the fixedly joined portion.

Because of the core assembly being an assembly of the thin strip blocks as described above, even when the fixedly joined portions of the thin strip blocks are formed by welding, for example, and have electrical conductivity, a short circuit path in the magnetic core including the core assembly is divided for each of the thin strip blocks. When multiple thin strips are integrated by welding, for example, as disclosed in International Publication No. 1999/21264, the obtained magnetic core is formed as a unit integrated electrically as well, and a short circuit path in the magnetic core is long. As a length of the short circuit path increases, an eddy current loss in the magnetic core also increases. Thus, the iron loss, particularly the eddy current loss, is less apt to increase in the magnetic core according to the present invention in which the short circuit path is divided in units of the thin strip block.

A relationship between a direction in which the thin strip blocks forming the core assembly are arrayed and a direction in which the nanocrystalline thin strips are laminated in the thin strip block is optional. The array direction and the lamination direction may be the same or different.

In the above-described magnetic core, the fixedly joined portion may include side surfaces of the nanocrystalline thin strips. This makes it easier to visually recognize the fixedly joined portion and to check a fixedly joined state of the thin strip block.

In the above-described magnetic core, the fixedly joined portion may be a laser welded portion. Since the nanocrystalline thin strips are fixedly joined stably in the thin strip block, ease in handling the thin strip block is increased, and failures, such as damages, are less likely to occur during a step of arranging the thin strip blocks to fabricate the core assembly.

In the above-described magnetic core, the nanocrystalline thin strip may be a member obtained by nano-crystallizing an amorphous thin strip made of an amorphous alloy material with heat treatment. In this case, the thin strip block preferably has a thickness at which the amorphous thin strip can produce the nanocrystalline thin strip with the heat treatment. If the thickness of the thin strip block is too large, there is a concern that temperature control may be disabled in the heat treatment of the amorphous thin strips and that burning of the thin strip block may occur. In practice, the thickness of the thin strip block is preferably 3 mm or less in some cases from the viewpoint of ease in control of the heat treatment of the amorphous thin strips.

In the above-described magnetic core, a nanocrystal contained in the nanocrystalline thin strip may have a bcc-Fe phase as a main phase. With an effect of random magnetic anisotropy due to the nano-crystallization, good soft magnetic characteristics can be obtained while high saturation magnetic flux density is ensured.

In the above-described magnetic core may include a shift-arranged thin strip block group made up of the multiple thin strip blocks arrayed along a first direction, the group including a portion in which the fixedly joined portions of the multiple thin strip blocks are not aligned in the first direction. A practical example of the first direction is a thickness direction of the nanocrystalline thin strip. The fixedly joined portion has different magnetic characteristics from other portions in some cases. Even in those cases, uniformity in magnetic characteristics of the magnetic core including the core assembly can be improved depending on the case by arranging the thin strip blocks such that the fixedly joined portions included in the core assembly are not aligned in one direction.

In the above-described magnetic core, the core assembly may be covered with an impregnated coating. When the core assembly is covered with the impregnated coating, a failure of peeling-off of the thin strips from the core assembly is less likely to occur.

According to another aspect, the present invention provides a magnetic component including the above-described magnetic core.

BRIEF DESCRIPTION OF THE DRAWINGS

FIG. 5 is a flowchart illustrating one example of a manufacturing method for the magnetic core according to the embodiment of the present invention;

FIG. 6 is a flowchart illustrating another example of the manufacturing method for the magnetic core according to the embodiment of the present invention;

FIG. 8A is an explanatory view of a manufacturing process for a hoop material made of a ribbon of amorphous thin strip to form nanocrystalline thin strips included in the magnetic core according to the embodiment of the present invention;

FIG. 8B is an explanatory view illustrating a configuration of the hoop material made of the ribbon of amorphous thin strip and manufactured by the manufacturing process illustrated in FIG. 8A;

FIG. 8C is an explanatory view illustrating a stamped section of the hoop material made of the ribbon of amorphous thin strip, illustrated in FIG. 8B;

DESCRIPTION OF THE PREFERRED EMBODIMENTS

Embodiments of the present invention will be described below with reference to the drawings. In the following description, the same members are denoted by the same signs, and duplicate description of the members that have been explained once is omitted as appropriate.

Figures 1A, 1B:
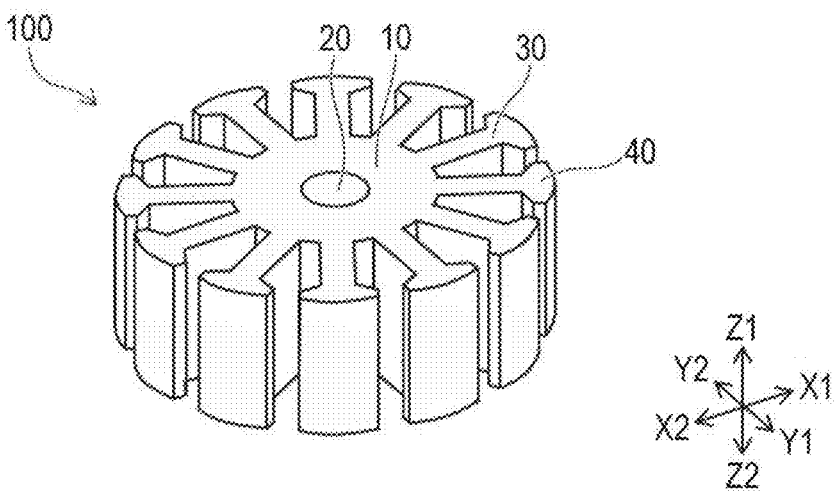
FIG. 1A is a perspective view illustrating a magnetic core according to an embodiment of the present invention.
FIG. 1B illustrates a core assembly included in the magnetic core illustrated in FIG. 1A.
Figure 2A:
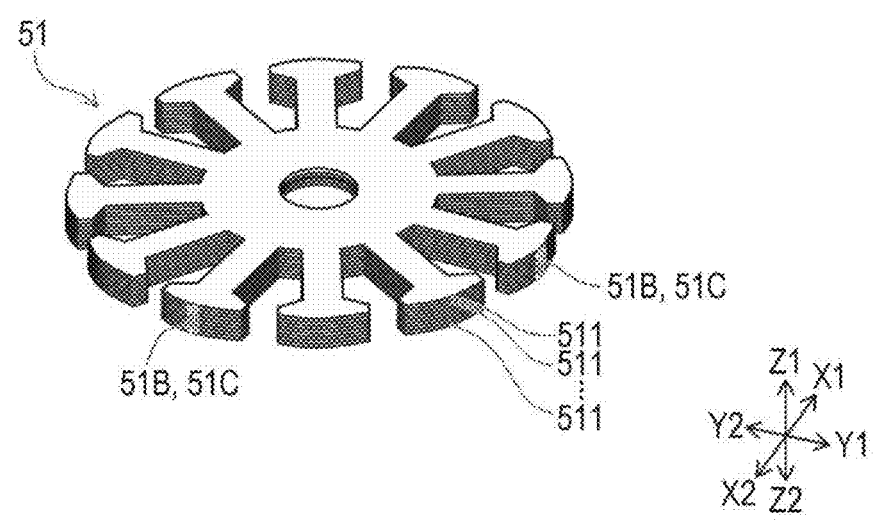
FIG. 2A illustrates a thin strip block included in the core assembly illustrated in FIG. 1B.
Figure 2B:
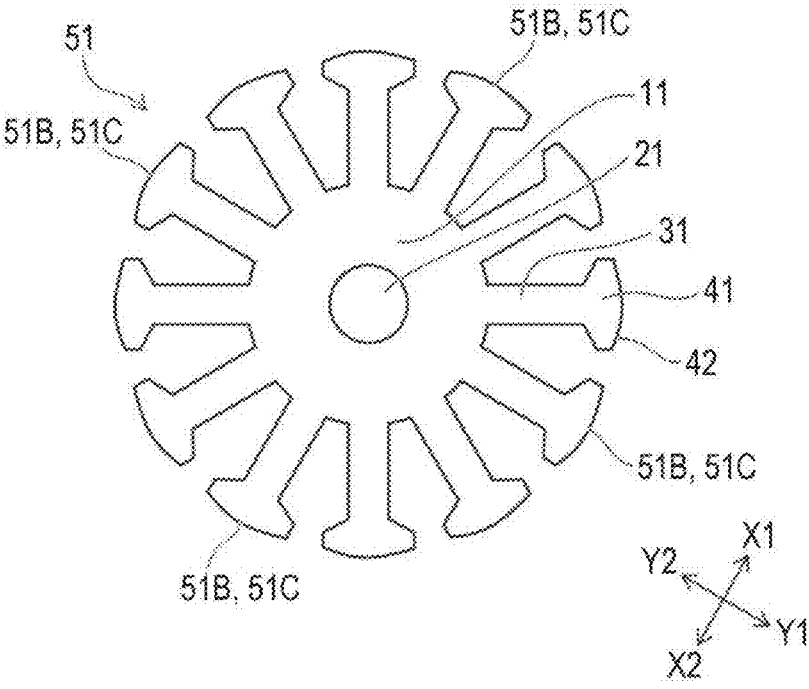
FIG. 2B is a plan view of the thin strip block.

FIG. 1A is a perspective view illustrating a magnetic core according to an embodiment (first embodiment) of the present invention. FIG. 1B illustrates a core assembly included in the magnetic core illustrated in FIG. 1A. FIG. 2A illustrates a thin strip block included in the core assembly illustrated in FIG. 1B. FIG. 2B is a plan view of the thin strip block.

As illustrated in FIG. 1A, the magnetic core 100 according to the first embodiment has the shape of a motor stator. More specifically, the magnetic core 100 includes a cylindrical body portion 10 with a through-hole 20 passing a center axis along a Z1-Z2 direction, and multiple teeth 30 extending radially from an outer side surface of the cylindrical body portion 10 (in a direction within an XY plane). The magnetic core 100 illustrated in FIG. 1 includes twelve teeth 30, and each of the teeth 30 has a distal end portion 40 with a protrusion protruding in a circumferential direction and positioned at an outer end of the teeth 30.

The magnetic core 100 is obtained by forming an impregnated coating on the core assembly 50, illustrated in FIG. 1B, which is in the form of a soft magnetic body. The impregnated coating is formed by applying a coating material, provided as a resin material, to adhere to a surface of the core assembly 50, thus making the surface impregnated with the resin material. The coating material is made of, for example, epoxy resin. A thickness of the impregnated coating is set such that the impregnated coating properly covers the core assembly 50 being a conductor and gives the magnetic core 100 with appropriate insulation. In an example not intended to impose any limitations, the thickness of the impregnated coating is from 0.1 μm to 5 μm.

The core assembly 50 is composed of multiple thin strip blocks 51. The core assembly 50 illustrated in FIG. 1B is constituted by a laminate of five thin strip blocks 51, 52, 53, 54 and 55 laminated in the Z1-Z2 direction.

The thin strip block 51 is a laminate of multiple nanocrystalline thin strips 511. The nanocrystalline thin strips 511 are made of a nanocrystal-containing alloy material. The thin strip block 51 illustrated in FIG. 2A is a laminate of a number n of the nanocrystalline thin strips 511 laminated in the Z1-Z2 direction. As illustrated in FIG. 2B, a shape of the thin strip block 51 in the plan view (when viewed from the Z1-Z2 direction) is similar to that of the magnetic core 100. More specifically, the thin strip block 51 includes a penetrating portion 21 at a center of a circular body portion 11, and twelve teeth 31 extending radially from an outer side surface of the body portion 11. Each of the teeth 31 has a distal end portion 41 with a protrusion protruding in a circumferential direction and positioned at an outer end of each tooth 31.

The thin strip block 51 includes a fixedly joined portion 51B in which the nanocrystalline thin strips adjacent to each other in a lamination direction (Z1-Z2 direction) are fixedly joined together. In the thin strip block 51 illustrated in FIG. 2A, the fixedly joined portion 51B is disposed in part of each of the distal end portions 41 of the four teeth 31. In this embodiment, the fixedly joined portion 51B is a laser welded portion.

As described above, the core assembly 50 illustrated in FIG. 1B is fabricated by arranging the multiple thin strip blocks 51 each of which is prepared as an integrated body of the multiple nanocrystalline thin strips 511. Because of using the thin strip block 51, failures, such as damages, are less likely to occur in the nanocrystalline thin strips than in the case in which a laminated core is formed by laminating the nanocrystalline thin strips one by one. As a result, the quality of the magnetic core 100 obtained by forming the impregnated coating on the core assembly 50 can be increased.

Furthermore, an overall size of the core assembly 50 can be easily adjusted by changing the number of the arranged thin strip blocks 51, specifically the number of the laminated blocks, which are easy to handle. Therefore, the magnetic cores 100 with different magnetic characteristics can be easily fabricated. In addition, since the magnetic characteristics of the magnetic core 100 can be changed just by changing the number of the laminated thin strip blocks in the core assembly 50, change in the magnetic characteristics of the magnetic core 100 can be realized without changing heat treatment conditions for the laminate of the amorphous thin strips. Because, as described above, the heat treatment conditions need to be newly set whenever the number of the amorphous thin strips forming the laminate is changed, the magnetic core 100 according to this embodiment is superior in stability of quality and productivity to a magnetic core that is manufactured by using a method changing the number of the laminated thin strips in the laminate.

When the fixedly joined portion 51B of the thin strip block 51 is the laser welded portion as described above, the adjacent nanocrystalline thin strips 511 and 511 are electrically connected to each other through the fixedly joined portion 51B. Therefore, when an eddy current flows in the magnetic core 100, a short circuit path of the eddy current is formed in units of the thin strip block 51. Thus, since the core assembly 50 of the magnetic core 100 has a structure that the multiple thin strip blocks 51 are arranged, the short circuit path is formed in units of the thin strip block 51. Accordingly, an eddy current loss generated in the magnetic core 100 can be relatively reduced. On the other hand, when the fixedly joined portion is disposed to fixedly join all magnetic plates forming a laminated core together as in the laminated core disclosed in International Publication No. 1999/21264, for example, a short circuit path is formed through the entirety of the laminated core, and the eddy current loss is increased.

Figure 3A:
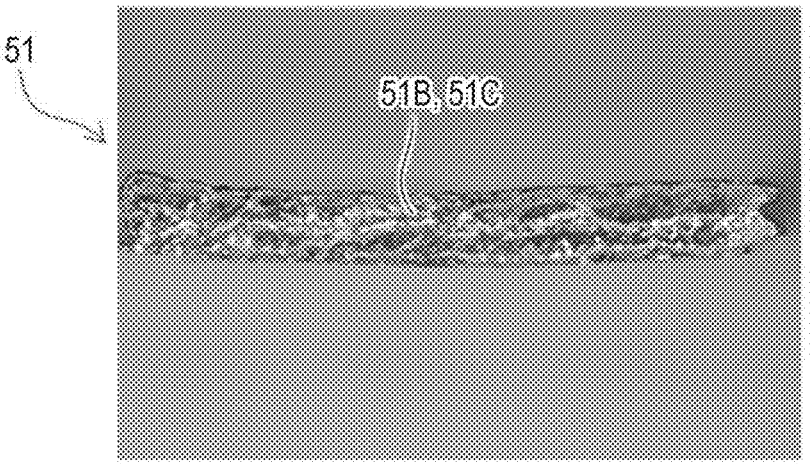
FIG. 3A illustrates an example of a fixedly joined portion formed in the thin strip block when cutting and welding of a thin strip laminate are performed at the same time (namely, in the case of fusion cutting)
Figure 3B:
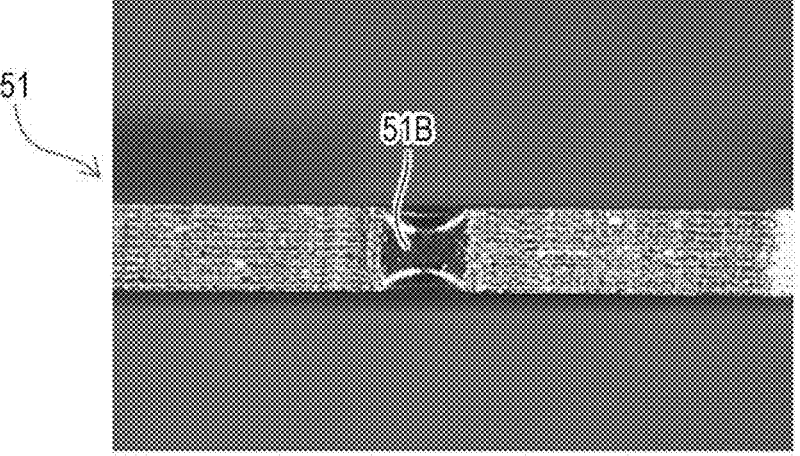
FIG. 3B illustrates another example of the fixedly joined portion formed in the thin strip block when parts of cut surfaces of the thin strip laminate are welded to each other.

There are no limitations on a fixedly joining method used in forming the fixedly joined portion 51B. The adjacent nanocrystalline thin strips in the thin strip block 51 may be fixedly joined with an adhesive. When the fixedly joined portion 51B is positioned in a region including side surfaces of the nanocrystalline thin strips 511, the fixedly joined portion 51B may be cut portions of the nanocrystalline thin strips 511. In a practical example of such a case, the fixedly joined portion 51B is a fusion cut portion. FIG. 3A illustrates one example of the fixedly joined portion 51B disposed in the thin strip block 51 and represents the case (fusion cutting) in which cutting (represented by a cutting mark region 51C) and welding (represented by the fixedly joined portion 51B) of the laminate of the nanocrystalline thin strips 511 are performed at the same time. FIG. 3B illustrates another example of the fixedly joined portion 51B disposed in the thin strip block 51 and represents the case in which the fixedly joined portion 51B is formed by partly welding cut surfaces of the laminate of the nanocrystalline thin strips 511 together.

The core assembly 50 illustrated in FIG. 1B includes a shift-arranged thin strip block group including a portion in which respective fixedly joined portions 51B, 52B, 53B, 54B, and 55B of the five thin strip blocks 51, 52, 53, 54, and 55 arrayed along a first direction (Z1-Z2 direction) are not aligned in the first direction (Z1-Z2 direction). As illustrated in FIG. 2B, the thin strip block 51 includes four fixedly joined portions 51B that are positioned at the protrusions 42 in the distal end portions 41 of the teeth 31 and that are arranged in every third tooth of the twelve teeth 31 of the thin strip block 51. Moreover, in two adjacent thin strip blocks (for example, the thin strip blocks 51 and 52) in the core assembly 50, the two fixedly joined portions 51B and 52B are not aligned in the first direction (Z1-Z2 direction). With the thin strip blocks 51, 52, 53, 54, and 55 arranged in the core assembly 50 as described above, even when the fixedly joined portions 51B, 52B, 53B, 54B, and 55B have different magnetic properties from other portions, it is expected that spatial variations in the magnetic characteristics of the core assembly 50 are less likely to occur.

Figure 4A:
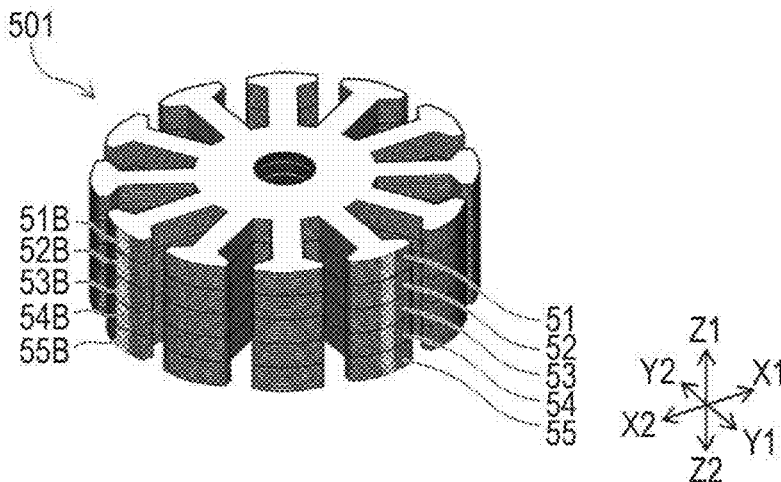
FIG. 4A illustrates one modification of the core assembly included in the magnetic core according to the embodiment of the present invention
Figure 4B:
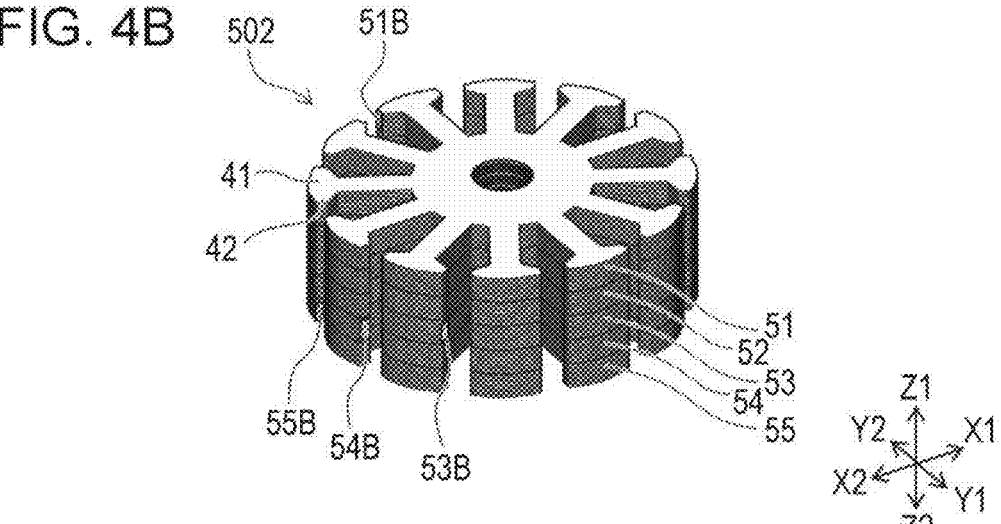
FIG. 4B illustrates another modification of the core assembly included in the magnetic core according to the embodiment of the present invention.
Figure 4C:
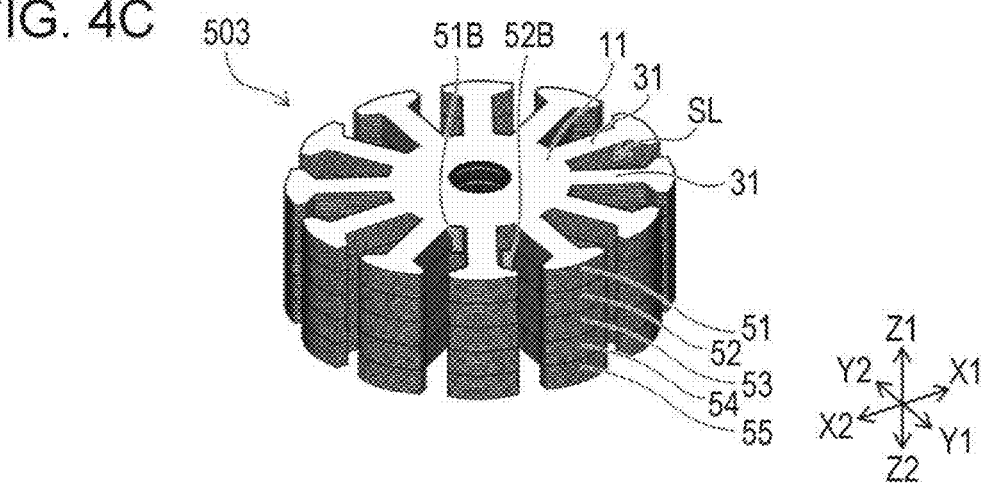
FIG. 4C illustrates still another modification of the core assembly included in the magnetic core according to the embodiment of the present invention.

While, in the core assembly 50 illustrated in FIG. 1B, the fixedly joined portion 51B of one thin strip block 51 in the core assembly 50 is arranged not to align with the fixedly joined portion 52B of another thin strip block 52 adjacent to the one thin strip block 51 in the first direction (Z1-Z2 direction) as described above, the present invention is not limited to that case. FIGS. 4A, 4B, and 4C illustrates modifications of the core assembly included in the magnetic core according to the embodiment of the present invention. Like a core assembly 501 illustrated in FIG. 4A, the fixedly joined portions of the adjacent thin strip blocks may be aligned in the first direction (Z1-Z2 direction). In this case as well, there is magnetic continuity between the two adjacent thin strip blocks, but there is no electrical continuity therebetween. Accordingly, the short circuit path in the core assembly 501 is formed in units of each of the thin strip blocks 51, 52, 53, 54, and 55.

In a core assembly 502 illustrated in FIG. 4B, unlike the core assembly in FIG. 4A, the fixedly joined portion is not disposed in an outermost side surface of the core assembly 502 and is disposed in a side surface positioned on an inner side than the outermost side surface. More specifically, in the core assembly 502, the fixedly joined portions 51B, 52B, 53B, 54B, and 55B are disposed in respective one side surfaces of the protrusions 42 in the distal end portions 41 of the teeth 31 in the circumferential direction. In a magnetic circuit of a magnetic component in which the magnetic core 100 including the core assembly 502 is used, a magnetic path is set to penetrate through the outermost side surface of the core assembly 502 in some cases. In those cases, if the fixedly joined portion is disposed in the outermost side surface, there is a possibility that the penetration of the magnetic path through the fixedly joined portion may affect characteristics of the magnetic component (for example, rotation characteristics of a motor). In the core assembly 502, since the fixedly joined portion is not disposed in the outer side surface of the protrusion 42 corresponding to the outermost side surface of the core assembly, it is expected that the magnetic characteristics of the magnetic core 100 including the core assembly 502 are less likely to be affected by the fixedly joined portion.

In a core assembly 503 illustrated in FIG. 4C, the fixedly joined portion 51B is disposed in an outer side surface of the body portion 11, the outer side surface being positioned in a space (corresponding to part of a slot SL of the magnetic core 100) between two adjacent teeth 31 of the thin strip block 51. When the fixedly joined portion 51B is disposed in the above-mentioned position, influences caused by the formation of the fixedly joined portion 51B upon the thin strip block 51 can be made smaller than in the case of disposing the fixedly joined portion 51B in part of the tooth 31. For example, when the fixedly joined portion 51B is formed in part of the tooth 31 by laser welding, there is a possibility that the tooth 31 may be partly deformed (solidified after melting) due to heat applied during the laser welding. On the other hand, in the case of the core assembly 503, because of the fixedly joined portion 51B being disposed in the body portion 11, even if deformation occurs with the formation of the fixedly joined portion 51B by the laser welding, the influences of the fixedly joined portion 51B upon the magnetic characteristics of the magnetic core 100 can be made smaller than in the case of forming the fixedly joined portion 51B in part of the tooth 31.

In this embodiment, the nanocrystalline thin strip 511 is a thin strip made of a nanocrystal-containing alloy material that is obtained by nano-crystallizing an amorphous thin strip made of an amorphous alloy material with heat treatment. More specifically, a nanocrystal contained in the nanocrystalline thin strip has a bcc-Fe phase as a main phase. As described later, the nanocrystalline thin strips 511 forming the thin strip block 51 are obtained by heat-treating the laminate of the amorphous thin strips corresponding to the thin strip block 51 at a time.

A thickness of the thin strip block 51 is set to a value at which the nanocrystalline thin strips 511 can be produced from the amorphous thin strips with the heat treatment. As a thickness of the laminate of the amorphous thin strips increases, heat generated due to crystallization of the amorphous thin strips is harder to be released to the outside of the laminate, and controllability of the heat treatment reduces. From the viewpoint of causing the heat treatment to progress properly, therefore, an upper limit is preferably set for the thickness of the thin strip block 51. On the other hand, because the nanocrystalline thin strip 511 produced with the heat treatment is hard and brittle, the laminate produced with the heat treatment preferably includes a certain number of the laminated nanocrystalline thin strips 511 from the viewpoint of increasing ease of handling. In consideration of the above point, a lower limit is preferably set for the thickness of the thin strip block 51.

In an example not intended to impose any limitations, the thickness of the thin strip block 51 is preferably 3 mm or less and more preferably 2 mm or less in some cases. In addition, the thickness of the thin strip block 51 is preferably 200 μm or more and more preferably 500 μm or more in some cases.

There are no limitations on a manufacturing method for the magnetic core 100 according to this embodiment, but the magnetic core 100 can be manufactured with high productivity when the following method is used to manufacture the magnetic core 100. FIG. 5 is a flowchart illustrating one example of the manufacturing method for the magnetic core according to the embodiment (first embodiment) of the present invention.

As illustrated in the flowchart of FIG. 5, a ribbon of amorphous thin strip is first fabricated by, for example, a single-roll method (step S101). The obtained ribbon of amorphous thin strip is cut into thin strips in units of a proper length, and stamping is performed on each of the obtained thin strips, whereby a stamped member having a shape illustrated in FIG. 2B in the plan view (when viewed from the Z1-Z2 direction) is obtained (step S102). Thus-obtained multiple stamped members are laminated one above another, and a laminate is obtained (step S103). Because the amorphous thin strip has higher toughness than the nanocrystalline thin strip after the heat treatment as described above, chipping or other damages of the thin strips are less likely to occur even when lamination work is performed.

A block-forming step of laser-welding an outer side surface of the obtained laminate at multiple locations is performed, and a block body is obtained (step S104). Heat treatment is performed on the obtained block body, and the thin strip block 51 is obtained (step S105). As described above, the heat treatment conditions are set such that crystallization properly progresses in all the amorphous thin strips forming the block body, and that failures (for example, generation of unnecessary matters, such as chemical compounds, and burning) caused by the heat generated due to the crystallization are properly suppressed.

The multiple thin strip blocks 51 obtained with the heat treatment are laminated one above another, and the core assembly 50 illustrated in FIG. 1B is obtained. At that time, rotary lamination of rotating, relative to one thin strip block 51, another thin strip block 52 adjacent to the former about a center axis of the penetrating portion 21 is performed such that the adjacent fixedly joined portions (for example, the fixedly joined portion 51B and the fixedly joined portion 52B) are not aligned in the first direction (Z1-Z2 direction) (step S106).

Secondary heat treatment is performed on the core assembly 50 as required (step S107), and impregnation coating is performed on the core assembly 50 (step S108), whereby the magnetic core 100 is obtained. After the impregnation coating, shape adjustment such as deburring is performed as required in some cases (step S109).

Figure 9A:
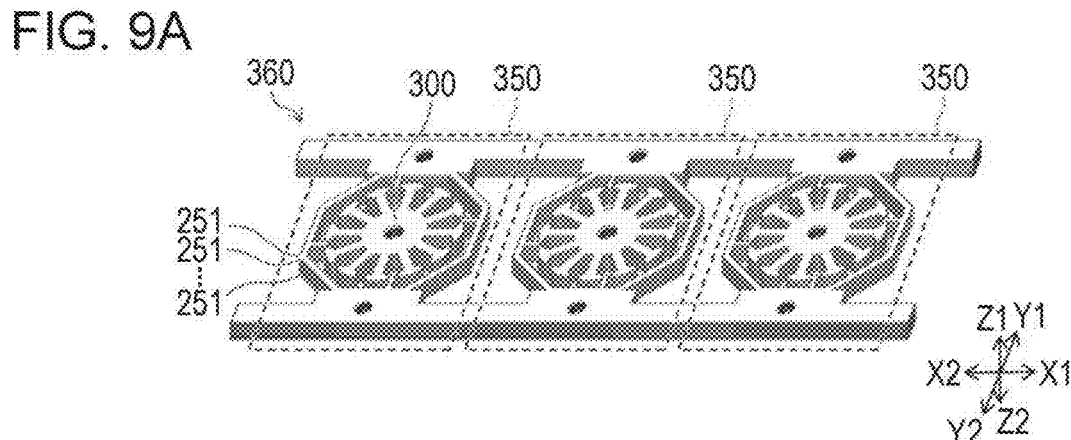
FIG. 9A illustrates a coupled laminate that is obtained after dividing the hoop material made of the ribbon of amorphous thin strip, illustrated in FIG. 8B, into smaller parts.
Figure 9B:
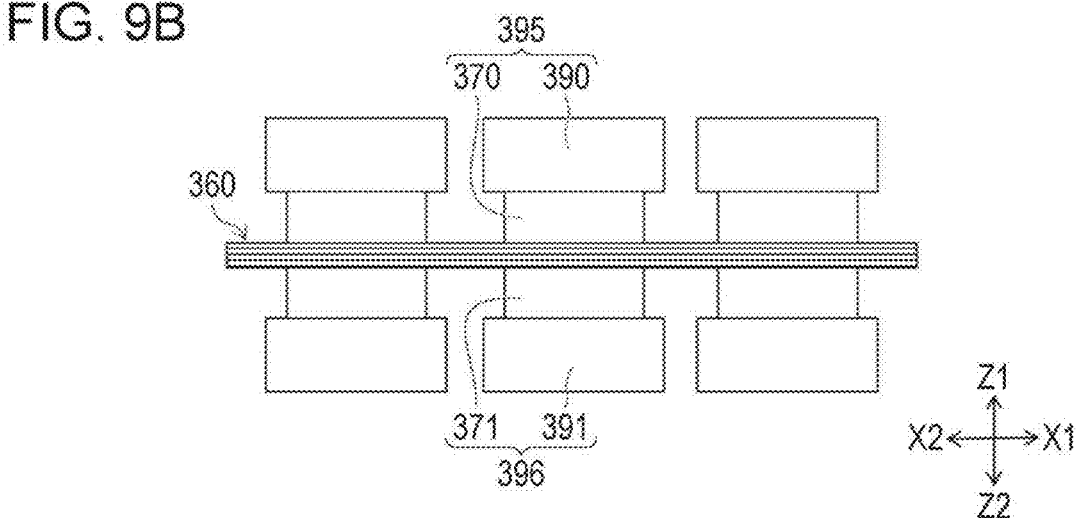
FIG. 9B is an explanatory view of heat treatment of the coupled laminate illustrated in FIG. 9A.
Figure 9C:
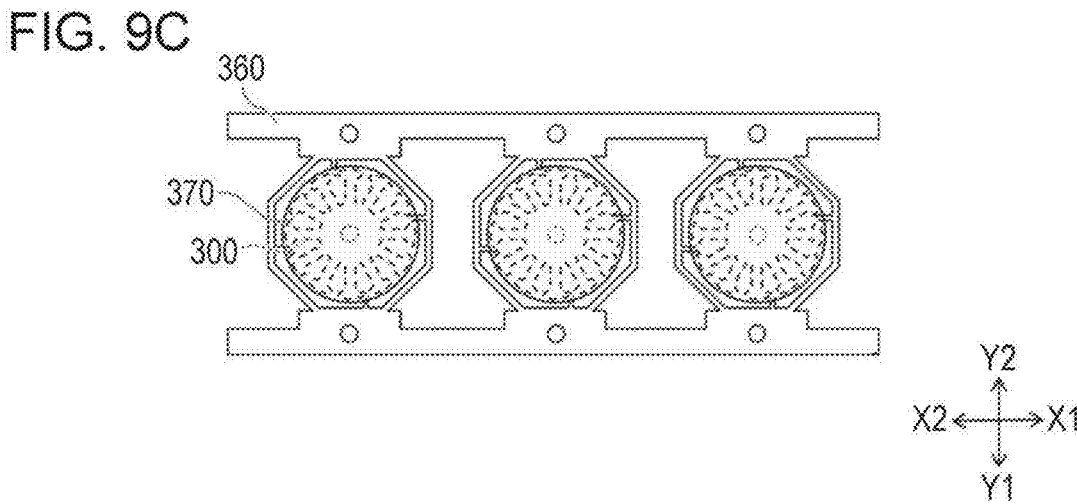
FIG. 9C illustrates an arrangement of heat treatment apparatuses used in the heat treatment illustrated in FIG. 9B.

A method of efficiently manufacturing the thin strip blocks 51 included in the core assembly 502 illustrated in FIG. 4B, the method including a step of heat-treating core thin strip segments 300 at the same time, will be described below with reference to FIGS. 6, 8A, 8B, 8C, 9A, 9B, and 9C. FIG. 6 is a flowchart illustrating another example of the manufacturing method for the magnetic core according to the embodiment of the present invention. FIG. 8A is an explanatory view of a manufacturing process for a hoop material made of a ribbon of amorphous thin strip to form nanocrystalline thin strips included in the magnetic core according to the embodiment of the present invention. FIG. 8B is an explanatory view illustrating a configuration of the hoop material made of the ribbon of amorphous thin strip and manufactured by the manufacturing process illustrated in FIG. 8A. FIG. 8C is an explanatory view illustrating a stamped section of the hoop material made of the ribbon of amorphous thin strip, illustrated in FIG. 8B. FIG. 9A illustrates a coupled laminate that is obtained after dividing the hoop material made of the ribbon of amorphous thin strip, illustrated in FIG. 8B, into smaller parts. FIG. 9B is an explanatory view of heat treatment of the coupled laminate illustrated in FIG. 9A. FIG. 9C illustrates an arrangement of heat treatment apparatuses used in the heat treatment illustrated in FIG. 9B.

In the manufacturing method illustrated in the flowchart of FIG. 6, the ribbon of amorphous thin strip is first fabricated by, for example, the single-roll method (step S201) in a like manner as in the manufacturing method illustrated in the flowchart of FIG. 5. With the obtained ribbon of amorphous thin strip having higher toughness than the nanocrystalline thin strip, the obtained ribbon of amorphous thin strip is coiled into a roll (amorphous roll 201).

Then, a hoop material 205 is fabricated by stamping (step S202). FIG. 8A illustrates a roll-to-roll method of fabricating the hoop material 205. The ribbon of amorphous thin strip 202 is unrolled from the amorphous roll 201 in one direction (specifically, toward an X1 side in an X1-X2 direction), and the stamping is performed on the ribbon of amorphous thin strip 202 with stamping dies (an upper die 203 and a lower die 204).

As illustrated in FIG. 8B, the obtained hoop material 205 includes stamped sections 350 each including the core thin strip segment 300 that finally becomes a substantial constituent member of the magnetic core 100, a base material segment 211 that extends in an in-plane direction of the core thin strip segment 300 (specifically, in the X1-X2 direction), and tie sticks 212 that connect the core thin strip segment 300 and the base material segment 211. The stamped sections 350 are arranged side by side in an extension direction of the base material segment 211 (in the X1-X2 direction). Positioning holes (positioning portions 213) are formed in the base material segment 211.

As illustrated in FIG. 8C, a shape of the core thin strip segment 300 of the stamped section 350 in the plan view (when viewed from the Z1-Z2 direction) is similar to that of the thin strip block 51. More specifically, the core thin strip segment 300 includes a penetrating portion 320 formed at a center of a circular body portion 310, and twelve teeth 330 extending radially from an outer side surface thereof. Each of the teeth 330 has a distal end portion 340 with a protrusion 341 protruding in a circumferential direction and positioned at an outer end of each tooth 330. As illustrated in FIG. 8C, some of the tie sticks 212 are connected to the protrusions 341 protruding in the circumferential direction (Y1-Y2 direction) in the distal end portions 340 of the two teeth 330 that extend along the X1-X2 direction. Some other of the tie sticks 212 are connected to the protrusions 341 protruding in the circumferential direction (X1-X2 direction) in the distal end portions 340 of the two teeth 330 that extend along the Y1-Y2 direction. Thus, cut portions CP of the tie sticks 212 are not positioned in connection with the outermost side surfaces of the distal end portions 340. In the thin strip block 51 obtained using the stamped section 350 illustrated in FIG. 8C, therefore, the fixedly joined portions 51B (namely, the cutting mark regions 51C) are not positioned in an outermost side surface of the thin strip block after the cutting as illustrated in FIG. 4B.

Regardless of whether a cutting method is laser cutting or mechanical cutting, a crystal state in the cutting mark region 51C may be changed from that in other regions. This raises a possibility that the magnetic characteristics of the magnetic core 100 in a portion in which the cutting mark region 51C is positioned may become different from those in other portions. Accordingly, when the magnetic path in the magnetic circuit of the magnetic component including the magnetic core 100 passes through the cutting mark region 51C, there is a possibility that the magnetic characteristics may be changed in the cutting mark region 51C and hence stability of the magnetic characteristics of the magnetic component may be affected. The resulting influence can be minimized by optimizing the cutting method. In the magnetic circuit of the magnetic component using the magnetic core 100 that includes the thin strip block 51, the magnetic path passes while penetrating the outermost side surface of the thin strip block 51 in some cases. However, since the core assembly 502 illustrated in FIG. 4B is obtained by using the stamped section 350 illustrated in FIG. 8C, for example, the possibility of the magnetic path in the magnetic circuit of the magnetic component passing through the cutting mark region 51C can be further reduced.

The hoop material 205 obtained by the stamping is coiled into a rolled material 206. Then, the hoop material 205 is unrolled from the rolled material 206 and is cut into smaller parts, whereby a coupled member 251 including a predetermined number (for example, three) of the stamped sections 350 coupled together is obtained (step S203). As illustrated in FIG. 9A, thus-obtained multiple coupled members 251 are laminated one above another in the Z1-Z2 direction, and a coupled laminate 360 is obtained (step S204). Here, by utilizing the positioning portions 213 in each of the coupled members 251, the coupled members 251 can be easily laminated in the Z1-Z2 direction without touching the core thin strip segments 300.

Then, heat treatment of the obtained coupled laminate 360 is performed (step S205). As illustrated in FIGS. 9B and 9C, multiple sets of heat treatment apparatuses 395 and 396 are prepared corresponding to the number of the laminates of the core thin strip segments 300 included in the coupled members 251 forming the coupled laminate 360, and the laminates of the core thin strip segments 300 are sandwiched respectively between the sets of the heat treatment apparatuses 395 and 396 in a lamination direction of the coupled laminate 360 (in the Z1-Z2 direction). The heat treatment apparatuses 395 and 396 are to control temperature of the core thin strip segments 300 and include, respectively, heat reservoirs 370 and 371 that have a substantially columnar shape and that come into direct contact with the core thin strip segments 300, and heater blocks 390 and 391 that heat the heat reservoirs 370 and 371. Thus, the heat treatment apparatuses 395 and 396 have not only the function of applying heat to the core thin strip segments 300, but also the function of receiving heat from the core thin strip segments 300. Since the multiple sets of the heat treatment apparatuses 395 and 396 are disposed as described above, conditions of the heat treatment applied to the laminates of the core thin strip segments 300 included in the coupled laminate 360 can be held equal. The heat treatment conditions are set such that the crystallization properly progresses in all the amorphous thin strips forming the core thin strip segments 300 in the coupled laminate 360, and that failures (for example, generation of unnecessary matters, such as chemical compounds, and burning) caused by the heat generated due to the crystallization are properly suppressed.

With the heat treatment performed as described above, the amorphous thin strips forming the core thin strip segments 300 in the coupled laminate 360 are crystallized and turn to the nanocrystalline thin strips 511. Then, laser fusion cutting is performed on portions (cut portions CP) of the protrusions 341 connected to the tie sticks 212 to separate each laminate of the core thin strip segments 300 (the nanocrystalline thin strips 511) and to fixedly join the nanocrystalline thin strips 511 forming the separated laminate together, whereby the thin strip block 51 illustrated in FIG. 4B is obtained (step S206). Thus, the fixedly joined portion 51B of the thin strip block 51 manufactured by the manufacturing method illustrated in the flowchart of FIG. 6 is also the cutting mark region 51C.

Thereafter, as in the steps illustrated in FIG. 5, the rotary lamination is performed (step S207), and the secondary heat treatment is performed (step S208) as required, whereby the core assembly 50 illustrated in FIG. 1B is obtained. Furthermore, the impregnation coating is performed (step S209), and the shape adjustment is performed (step S210) as required, whereby the magnetic core 100 illustrated in FIG. 1A is obtained.

Figure 10A:
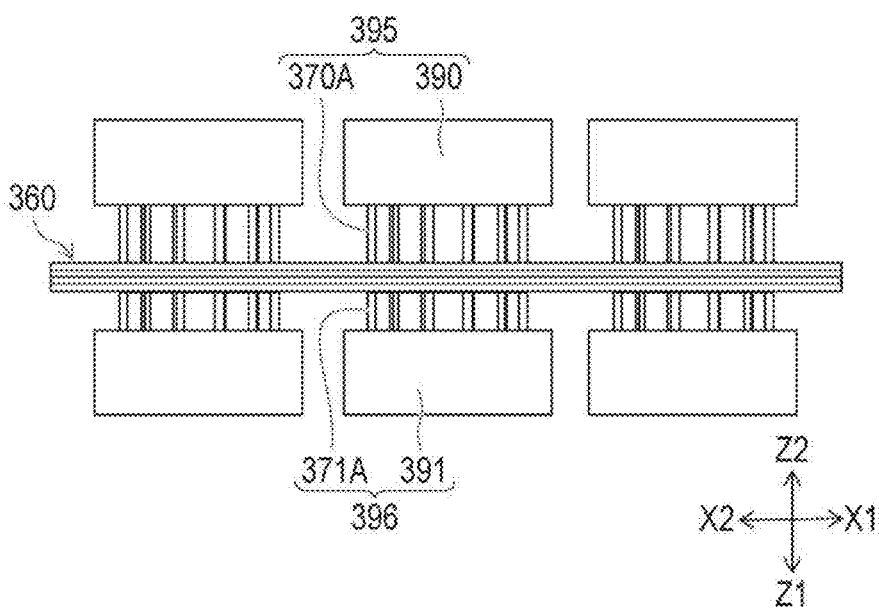
FIG. 10A is an explanatory view illustrating a modification of the heat treatment of the coupled laminate illustrated in FIG. 9B.
Figure 10B:
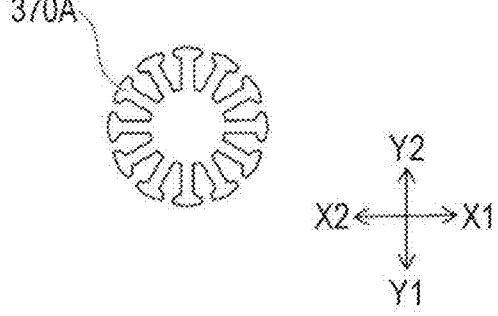
FIG. 10B is a plan view illustrating a shape of a heat reservoir used in the heat treatment illustrated in FIG. 10A.

FIG. 10A is an explanatory view illustrating a modification of the heat treatment of the coupled laminate illustrated in FIG. 9B, and FIG. 10B is a plan view illustrating a shape of a heating member used in the heat treatment illustrated in FIG. 10A.

When the heat reservoirs 370 and 371 included in the heat treatment apparatuses 395 and 396 have the substantially columnar shape as illustrated in FIG. 9B, the cut portions CP (see FIG. 8C) come into direct contact with the heat reservoir 370 as illustrated in FIG. 9C. In the coupled laminate 360 after the heat treatment step (step S205), therefore, the cut portions CP are also heat-treated and crystallized. Accordingly, there is a possibility that cutting workability may be reduced in the cut portions CP. As described above, the possibility of the magnetic path passing through the protrusions 341 to which the cut portions CP are connected is low. However, if the cutting workability is reduced, this may reduce uniformity in shape of the cutting mark regions 51C and may affect retention of shape quality of the thin strip block 51 in some cases.

When, as illustrated in FIG. 10A, a shape of each of heat reservoirs 370A and 371A in the plan view (when viewed from the Z1-Z2 direction) corresponds to the shape of the core thin strip segment 300 in the plan view, a portion of the tie stick 212, the portion being connected to the protrusion 341 of the distal end portion 340, is not heat-treated in the heat treatment step (step S205), and the amorphous alloy remains there. Accordingly, the cut portion CP has good cutting workability in the coupled laminate 360 after the heat treatment, and the shape quality is less apt to reduce even when, as illustrated in FIG. 4B, the fixedly joined portion 51B is positioned in the side surface of the protrusion 341 of the distal end portion 340 of the thin strip block 51.

Figure 7:
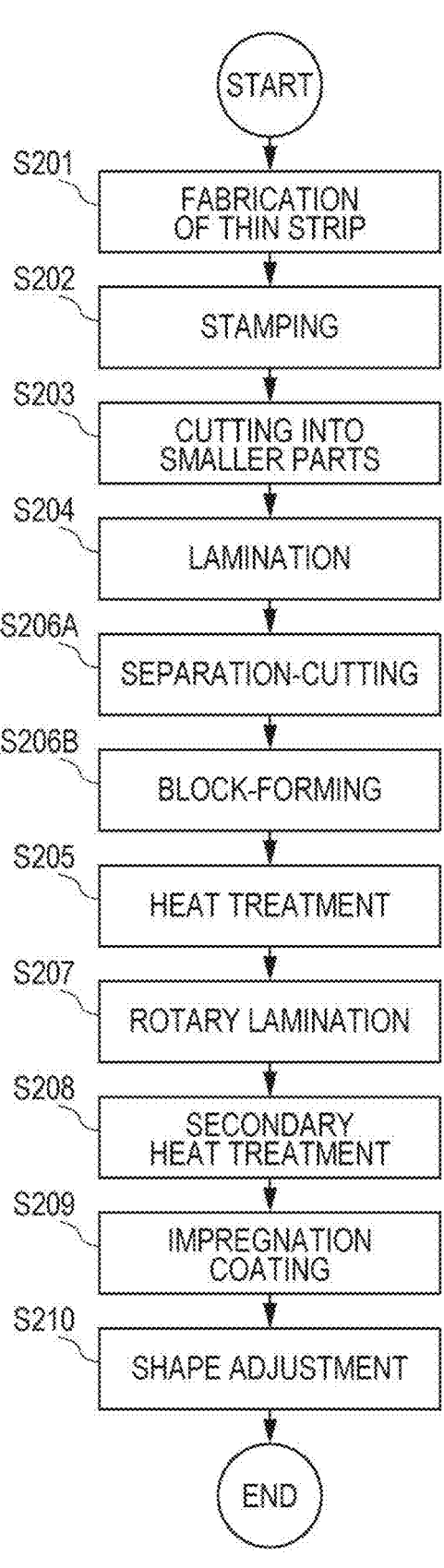
FIG. 7 is a flowchart illustrating still another example of the manufacturing method for the magnetic core according to the embodiment of the present invention.

While the laser fusion cutting is used in the manufacturing method illustrated in FIG. 6 to perform the cutting step and the block-forming step at the same time, those steps may be performed as separate steps. FIG. 7 is a flowchart illustrating still another example of the manufacturing method for the magnetic core according to the embodiment of the present invention.

Comparing with the flowchart illustrated in FIG. 6, the flowchart illustrated in FIG. 7 is different in that the "separation-cutting and block-forming" step of the step S206 is divided into a separation-cutting step (step S206A) and a block-forming step (step S206B). In this case, the separation-cutting step is performed by, for example, mechanical cutting, and the block-forming step is performed, for example, by laser welding. Furthermore, in the flowchart illustrated in FIG. 7, comparing with the flowchart illustrated in FIG. 6, the heat treatment step (step S205) is performed after the block-forming step (step S206B). When a portion made of the amorphous alloy is subjected to the heat treatment step (step S205), the amorphous alloy is nano-crystallized, and the cutting workability in such a portion is reduced. Thus, when the separation-cutting (step S206A) is performed before the heat treatment step (step S205), good cutting workability can be easily ensured for the tie stick 212. Moreover, when the amorphous thin strip is crystallized with the heat treatment and turns to the nanocrystalline thin strip 511, the thin strip becomes brittle, and ease in handling the thin strip is reduced. However, by performing the block-forming step (step S206B) before the heat treatment step (step S205), easy handling can be ensured because a product obtained with the heat treatment is the thin strip block 51 in which the nanocrystalline thin strips 511 are laminated and fixedly joined together.

Figure 11A:
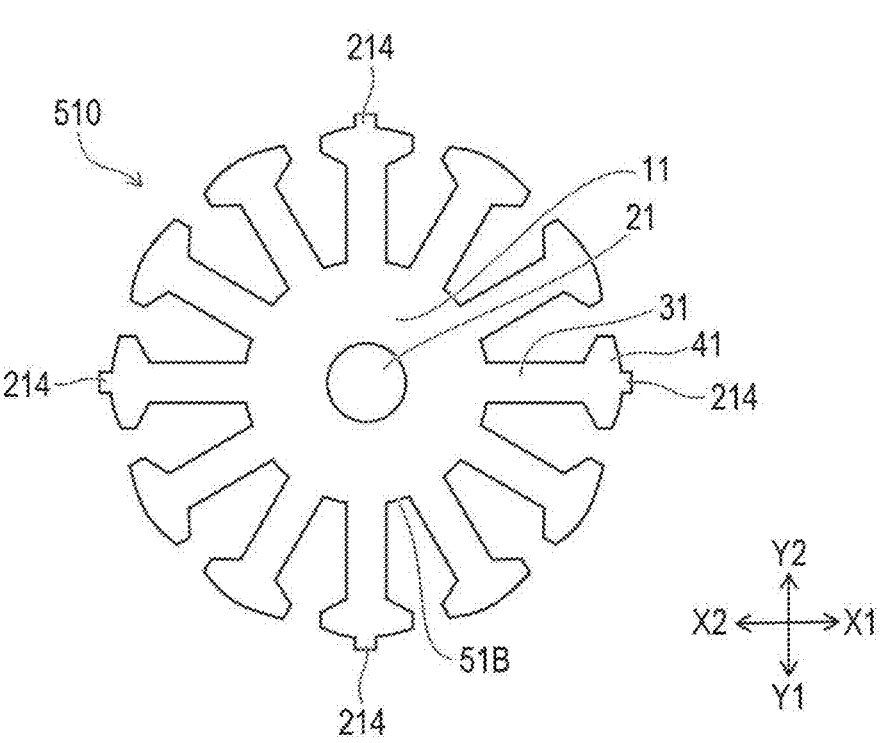
FIG. 11A is a plan view illustrating an example of a thin strip block manufactured by the manufacturing method illustrated in the flowchart of FIG. 7.
Figure 11B:
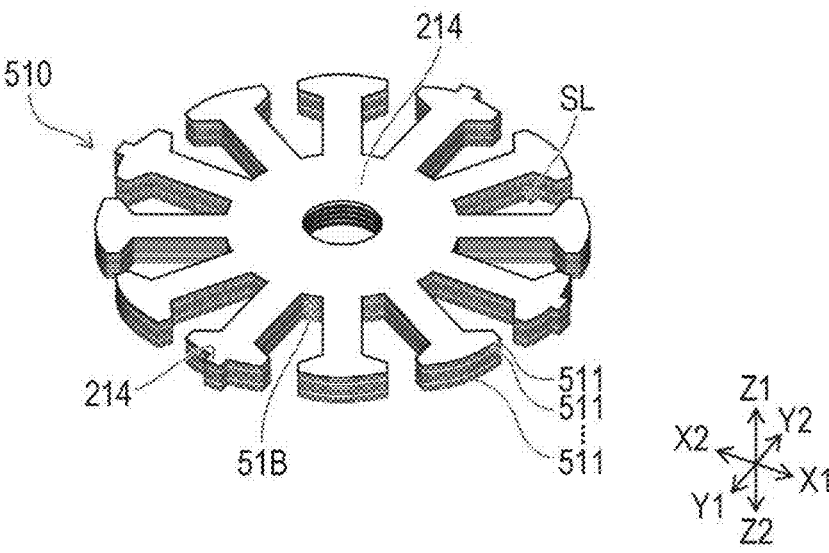
FIG. 11B is an explanatory view illustrating a fixedly joined portion of the thin strip block illustrated in FIG. 11A.

FIG. 11A is a plan view illustrating an example of a thin strip block manufactured by the manufacturing method illustrated in the flowchart of FIG. 7. FIG. 11B is an explanatory view illustrating a fixedly joined portion of the thin strip block illustrated in FIG. 11A. The thin strip block 510 illustrated in FIGS. 11A and 11B includes cutting residues 214 at outer ends of the distal end portions 41 of the teeth 31. The cutting residues 214 are residues after the cutting when the tie sticks 212 are cut in the cut portions CP in the separation-cutting step (step S206A). In the thin strip block 510 illustrated in FIGS. 11A and 11B, as in the core assembly 503 illustrated in FIG. 4C, the fixedly joined portion 51B is formed by the laser welding in the outer side surface of the body portion 11, that outer side surface defining the space corresponding to the slot SL.

Figure 12A:
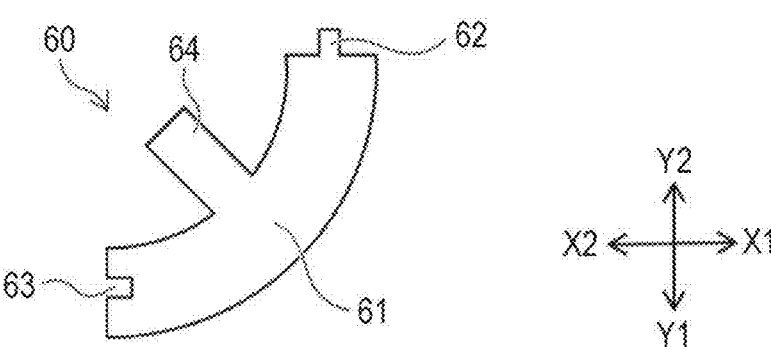
FIG. 12A is a plan view illustrating a shape of an amorphous thin strip to form a core assembly included in a magnetic core according to another embodiment of the present invention.
Figure 12B:
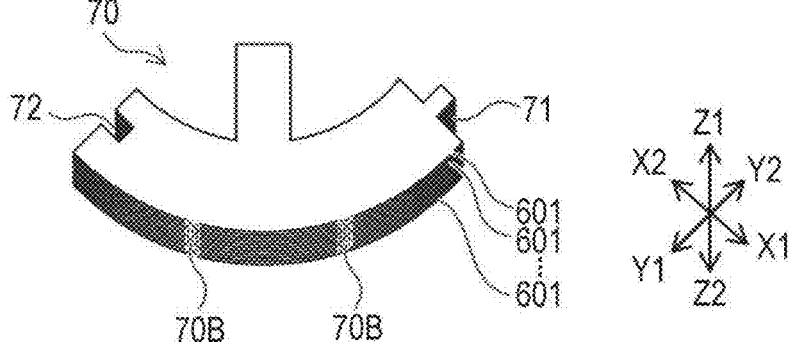
FIG. 12B illustrates a shape of a thin strip block formed using the amorphous thin strip illustrated in FIG. 12A.
Figure 13A:
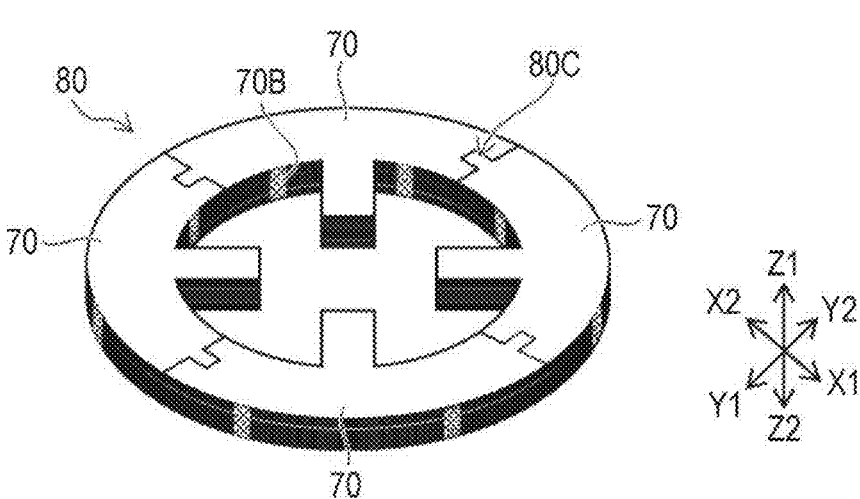
FIG. 13A illustrates a ring assembly including the thin strip blocks each illustrated in FIG. 12B.
Figure 13B:
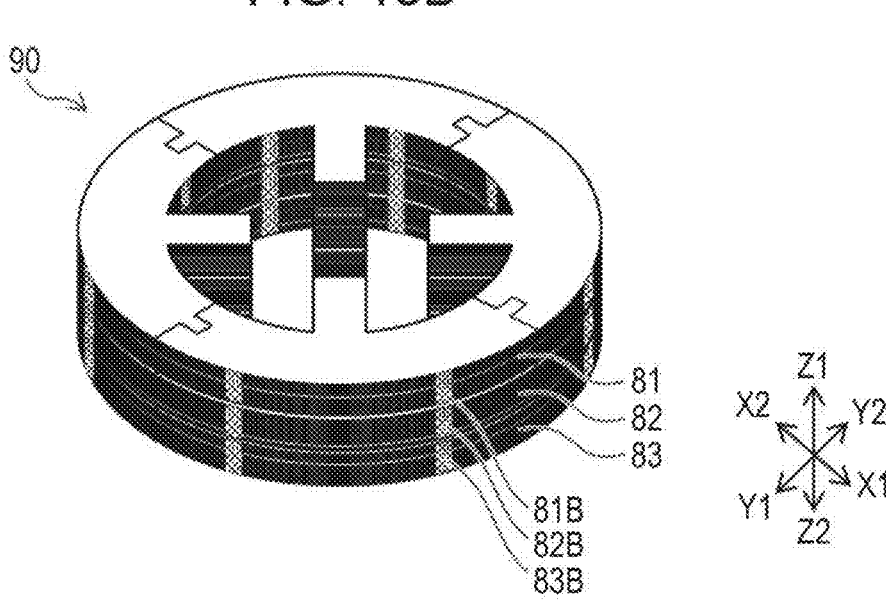
FIG. 13B illustrates a core assembly obtained by further combining the ring assemblies each illustrated in FIG. 13A.

FIG. 12A is a plan view illustrating a shape of an amorphous thin strip to form a core assembly included in a magnetic core according to another embodiment (second embodiment) of the present invention. FIG. 12B illustrates a shape of a thin strip block formed using the amorphous thin strip illustrated in FIG. 12A. FIG. 13A illustrates a ring assembly including the thin strip blocks each illustrated in FIG. 12B, and FIG. 13B illustrates a core assembly obtained by further combining the ring assemblies each illustrated in FIG. 13A.

In a core assembly 90 according to the second embodiment of the present invention, thin strip blocks 70 are arranged in order not only in a lamination direction (Z1-Z2 direction) of nanocrystalline thin strips 60 forming each of the thin strip blocks 70, but also in a direction different from the lamination direction.

As illustrated in FIG. 12A, the nanocrystalline thin strip 60 according to the second embodiment includes a body portion 61 in a shape similar to one of quarters dividing a circular ring, a projection 62 projecting from the body portion 61 in a circumferential direction of the circular ring, a recess 63 recessed into the body portion 61 in the circumferential direction of the circular ring, and a tooth 64 projecting from an inner circumferential side of the circular ring toward a center of the circular ring. The projection 62 and the recess 63 have engageable shapes such that one nanocrystalline thin strip 60 can be coupled to another one.

A thin strip block 70 including fixedly joined portions 70B is obtained by fixedly joining, into an integral unit, a laminate including nanocrystalline thin strips 601 laminated one above another along a thickness direction (Z1-Z2 direction). The thin strip block 70 includes an engagement projection 71 formed by the projections 62 of the nanocrystalline thin strips 60 and an engagement recess 72 formed by the recesses 63 of the nanocrystalline thin strips 60 such that one thin strip block 70 can be engaged with another thin strip block 70.

As illustrated in FIG. 13A, the core assembly 90 according to this embodiment includes a ring assembly 80 that is formed by engaging four thin strip blocks 70 with each other at engagement portions 80C and that has an annular shape in its entirety. A direction in which the thin strip blocks 70 are arrayed in the ring assembly 80 is different from the lamination direction (Z1-Z2 direction) of the nanocrystalline thin strips 60. Furthermore, as illustrated in FIG. 13B, the core assembly 90 is constituted by laminating multiple ring assemblies (three ring assemblies 81, 82, and 83 in FIG. 13B) one above another. Fixedly joined portions 81B, 82B, and 83B in the core assembly 90, given by the fixedly joined portions 70B of the thin strip blocks 70, are aligned in the lamination direction (Z1-Z2 direction). However, since the core assembly 90 is electrically separated for each of the thin strip blocks 70, the short circuit path is restricted within each thin strip block 70. As a result, an eddy current loss in the magnetic core including the core assembly 90 is less apt to increase.

Figure 14A:
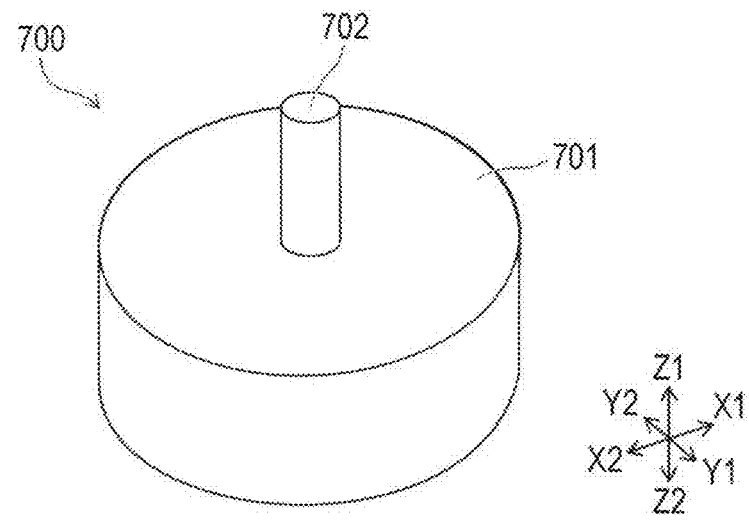
FIG. 14A is an external view of a motor that is an example of a magnetic product in which a magnetic component including the magnetic core according to the embodiment of the present invention is used.
Figure 14B:
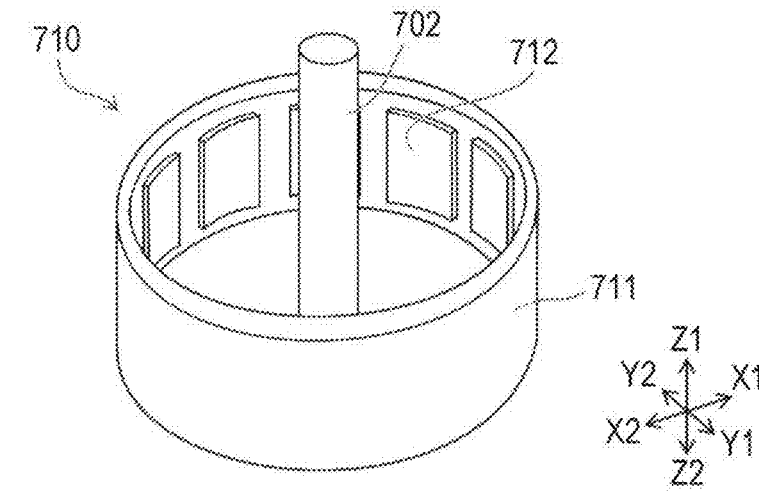
FIG. 14B is an external view of a rotor that is one of magnetic components included in the motor illustrated in FIG. 14A.
Figure 14C:
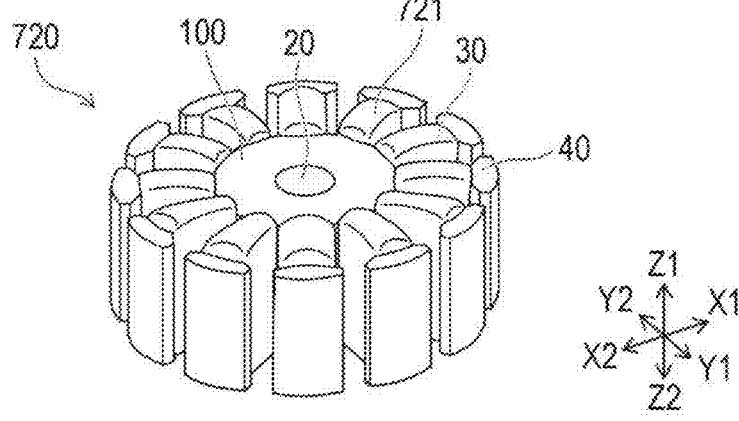
FIG. 14C is an external view of a stator that is another one of the magnetic components included in the motor illustrated in FIG. 14A.

FIG. 14A is an external view of a motor that is an example of a magnetic product in which a magnetic component including the magnetic core according to the embodiment of the present invention is used. FIG. 14B is an external view of a rotor that is one of magnetic components included in the motor illustrated in FIG. 14A. FIG. 14C is an external view of a stator that is another one of the magnetic components included in the motor illustrated in FIG. 14A. As illustrated in FIG. 14A, the motor 700 includes a motor body 701 in a cylindrical shape, and a rotating shaft 702 passing a center of a bottom surface of the motor body 701 and protruding from the motor body 701 toward a Z1 side in the Z1-Z2 direction.

The rotor 710 illustrated in FIG. 14B is disposed inside the motor body 701 to be rotatable about a rotation axis extending in the Z1-Z2 direction. The rotor 710 includes a rotor body 711 in a hollow columnar shape with one of bottom surfaces (on the Z1 side in the Z1-Z2 direction) being open, and the rotating shaft 702 fixed to a central portion of the other bottom surface (on a Z2 side in the Z1-Z2 direction) of the rotor body 711. Multiple magnets 712 are arranged on an inner wall of the rotor body 711 side by side in a circumferential direction.

The stator 720 in a columnar external shape is disposed between the rotor body 711 and the rotating shaft 702 of the rotor 710. The stator 720 is composed of the magnetic core 100 according to the embodiment of the present invention, and coils 721 wound around the teeth 30 of the magnetic core respectively. The rotating shaft 702 is inserted through the through-hole 20 of the magnetic core 100. The magnets 712 of the rotor 710 are disposed on the inner wall of the rotor body 711 to face the distal end portions 40 of the teeth 30 of the magnetic core 100 in one-to-one correspondence.

The magnetic core 100 according to the embodiment of the present invention has good magnetic characteristics because the core assembly 50 including the thin strip blocks 51 laminated one above another, each of the thin strip blocks 51 being the laminate of the nanocrystalline thin strips 511 fixedly joined together in the fixedly joined portions 51B, is firmly integrated by the impregnated coating. More specifically, the thin strip blocks 51 included in the core assembly 50 are magnetically connected but are not electrically connected, and hence the eddy current loss is small. Furthermore, in the case of the magnetic core 100 including the core assembly 502 (see FIG. 4B), since the fixedly joined portion 51B is not disposed in the outermost side surface of the distal end portion 41, the magnetic circuit in the motor 700 is easily stabilized. It is therefore expected that, particularly, rotation characteristics of the motor 700 are stabilized.

The above embodiments are described with intent to make easier understanding of the present invention and not to limit the present invention. Thus, individual elements disclosed in the above-described embodiments are purported to include all of design changes and equivalents falling within the technical scope of the present invention.

What is claimed is:

1. A magnetic core comprising:
    a core assembly including a plurality of thin strip blocks assembled together, each of the plurality of thin strip blocks being a laminated body formed of a plurality of nanocrystalline thin strips made of a nanocrystal-containing alloy material, wherein each of the plurality of thin strip blocks includes fixing portions in which the plurality of nanocrystalline thin strips are joined to each other in a lamination direction of the laminated body;

wherein each of the plurality of thin strip blocks further comprises a body portion and a plurality of teeth extending radially and outwardly from an outer side surface of the body portion, and the plurality of teeth of the plurality of thin strip blocks are aligned with each other in the lamination direction of the laminated body;

wherein the fixing portions are disposed on respective one side surfaces of protrusions in distal end portions of the plurality of teeth in a circumferential direction or disposed on respective outer side surfaces of the body portion positioned between two adjacent teeth of the plurality of teeth.

2. The magnetic core according to claim 1, wherein the fixing portions are laser welded portions where the nanocrystalline thin strips are laser welded to each other.

3. The magnetic core according to claim 1, wherein each nanocrystalline thin strip is formed by nano-crystallizing an amorphous thin strip made of an amorphous alloy material with a heat treatment, and wherein the thin strip block has such a thickness that the nanocrystalline thin strip is produced from the amorphous thin strip by the heat treatment.

4. The magnetic core according to claim 3, wherein the thickness of the thin strip block is 3 mm or less.

5. The magnetic core according to claim 1, wherein the nanocrystalline thin strip contains a nanocrystal having a bcc-Fe phase as a main phase.

6. The magnetic core according to claim 1, wherein the plurality of thin strip blocks are arranged along a first direction in such a manner that the fixing portions of the plurality of thin strip blocks are not aligned in the first direction.

7. The magnetic core according to claim 1, further comprising:

an impregnated coating covering the core assembly.

8. A magnetic component comprising the magnetic core according to claim 1.

9. The magnetic core according to claim 1, wherein the fixing portions electrically connect the plurality of the nanocrystalline thin strips within the thin strip blocks, while the plurality of the thin strip blocks are electrically separated from each other.

10. The magnetic core according to claim 1, wherein the plurality of thin strip blocks are stacked on one another along a laminating direction of the plurality of nanocrystalline thin strips.

11. The magnetic core according to claim 1, wherein the plurality of thin strip blocks are engaged with one another along a circumferential direction perpendicular to a laminating direction of the plurality of nanocrystalline thin strips.

\* \* \* \* \*